(12) United States Patent
Zoe

(10) Patent No.: US 12,256,713 B2
(45) Date of Patent: Mar. 25, 2025

(54) PET TOY WITH OPENINGS FOR AIR FLOW

(71) Applicant: Thais Zoe, Scottsdale, AZ (US)

(72) Inventor: Thais Zoe, Scottsdale, AZ (US)

( * ) Notice: Subject to any disclaimer, the term of this patent is extended or adjusted under 35 U.S.C. 154(b) by 185 days.

(21) Appl. No.: 17/574,472

(22) Filed: Jan. 12, 2022

(65) Prior Publication Data

US 2022/0217945 A1 Jul. 14, 2022

Related U.S. Application Data

(60) Provisional application No. 63/136,835, filed on Jan. 13, 2021.

(51) Int. Cl.
*A01K 15/02* (2006.01)

(52) U.S. Cl.
CPC ................... *A01K 15/025* (2013.01)

(58) Field of Classification Search
CPC .. A01K 15/025; A01K 15/026; A01K 15/027; A63B 43/00; A63B 43/002; A63B 2243/007; A63B 2225/01; A63B 37/0074; A63B 37/08
USPC .......... 119/702, 707, 709; D30/160
See application file for complete search history.

(56) References Cited

U.S. PATENT DOCUMENTS

| | | | | |
|---|---|---|---|---|
| 5,033,743 A * | 7/1991 | Wright | ................ | A63B 43/00 273/DIG. 20 |
| 5,072,947 A * | 12/1991 | Blue | ................ | A63B 59/80 273/371 |
| 5,280,906 A * | 1/1994 | Vitale | ................ | A63B 43/00 273/DIG. 20 |
| 2003/0022588 A1* | 1/2003 | Silverglate | ............ | A63B 43/00 446/87 |
| 2011/0275463 A1* | 11/2011 | Lim | ................ | A63B 39/00 473/613 |
| 2012/0279459 A1* | 11/2012 | Angle | ................ | A01K 15/026 119/707 |

OTHER PUBLICATIONS https://www.amazon.com/dp/B07YLSWL2N?ref_=cm_sw_r_ud_dp_HRDKT8GNYJ8ETC5T3V5J, 10 pages.

* cited by examiner

*Primary Examiner* — Jeffrey R Larsen
(74) *Attorney, Agent, or Firm* — Cislo & Thomas, LLP

(57) ABSTRACT

A toy is disclosed. The toy can comprise a pet toy ball with one or more holes that can be optionally coupled to one or more corresponding channels within the toy. The pet toy ball can be made of a durable material such as silicone rubber, or foam. The pet toy ball can be made of a material that enables the pet toy ball to bounce. The one or more holes can include a rounded or beveled transition from the periphery (or exterior) of the toy to an interior surface of a hole. The pet toy ball can be made of a material that is chew resistant, i.e., a material that reduces potential for the toy to be torn by a pet chewing on the pet toy ball. The one or more holes when connected to channels permit air to pass into the mouth of a pet.

20 Claims, 4 Drawing Sheets

PET TOY WITH OPENINGS FOR AIR FLOW

RELATED APPLICATIONS

This application claims the benefit of U.S. Provisional Application No. 63/136,835, entitled "PET TOY," and filed on Jan. 13, 2021, which is incorporated herein by reference in its entirety.

FIELD

The present disclosure is directed generally to a toy, and, more particularly, to a toy for use by a pet or a person, for example, in one implementation, the toy can be used by the owner of the pet to play with the pet by throwing the toy around.

BACKGROUND

Typically, the body of a dog cools through the pads of the dog's feet, the dog's ears, and/or the dog's tongue, mouth and throat area. Dogs do not perspire like humans and even on a pleasant day (when humans are not aware of potential harm or hazard) dogs can easily overheat. When a dog holds an object between its jaws against its tongue or in the mouth, the flow of air to the dog's tongue, throat and mouth area can be restricted or blocked, thereby impeding the cooling of the dog's body, and possibly resulting in overheating of the dog's body. Dogs are often not able to track the overheating of their body while holding such objects, e.g., toys or balls, within their mouth and will continue to play until they suffer an adverse health event. Such adverse events due to overheating of a dog's body include, but are not limited to, diminished capacity, heat exhaustion, stroke, or even sudden death. To avoid such adverse health events, pet owners may avoid playing with their dogs outdoors when outdoor temperatures run high, e.g., in weather sufficient to cause a dog or other pet to overheat.

Thus, a need may exist for a device, an object, or a toy that is buoyant, that can bounce, that is chew resistant, and that comprises channels to enable flow of air through the toy. More specifically, a need may exist for a toy (e.g., a ball or other shape) that is capable of being held in its entirety between the jaws or inside the mouth of a pet, a toy that is designed to produce adequate bounce when it makes contact with a surface, and a toy that comprises a semi-hollow object including one or more openings that allow air to flow through the one or more openings from outside to the inside of the mouth of the pet through channels coupled to the openings, and where the openings include rounded and or beveled transitions from an exterior or periphery of the toy to an interior surface of the openings to help prevent the toy from being torn apart or damaged when chewed on by a pet.

Thus, there exists a need for a pet toy that is capable of being held between the jaws or in the mouth of pets, is buoyant and bouncy, and is made of a durable material (e.g., self-healing silicone) with openings having rounded or beveled edges (or transitions) to help reduce or prevent damage and/or destruction of the toy (e.g., being torn apart by a pet), and that protects the pet's teeth.

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY

Some implementations can include one or more of several important features: shape, one or more rounded or beveled openings, channels coupling two or more openings, material, toughness/indestructability (or near indestructability), bounce, and buoyancy.

Regarding shape, the term "toy ball" is used herein to define any physical object or a group of objects that have the characteristics of a ball such as being generally spherical in nature. It will be appreciated that a ball is used as an example herein to illustrate principles of the disclosed subject matter and that other toy object shapes or types are contemplated, for example, implementations can include a bone shaped toy and a disc shaped toy. In general, the toy shape may include, but is not limited to ovoid (or three dimensional oval shaped), bone, disc, ring, oval, rope, stick, rod, snake, cat, dog, squirrel, rabbit, hedgehog, pig, owl, other animals and shapes for play. The terms "opening" and "hole" are used herein to refer interchangeably to a slot, an aperture, or a slit. In general, the disclosed subject matter can include an object with at least one opening that optionally couples to a channel and another opening, where the channel passes from one area of the object to another area of the object to permit air to flow through the opening to the other opening (e.g., to permit air to flow from the exterior of a pet's mouth area to the interior of the pet's mouth area to aid in cooling).

Regarding rounded or beveled openings, some implementations can include different shaped openings (e.g., circles, ovals, squares, slits, slots, etc.). In general, an implementation can include one or more openings that may connect to a channel or may not connect to a channel. Thus, an implementation can include as few as one opening. Each opening can include a beveled or rounded edge. The term "edge" as used herein refers to the transition from an exterior or periphery of the toy to an interior surface of an opening. For example, the rounded edge of the ball can have an approximate ¼" radius. At an example 4" scale of the ball referenced, a ¼" radius provides the edges needed to deter chewing, tearing, etc. Beveled and/or rounded as used herein are not intended to be limiting, but rather are intended to include implementations with edges or transitions that are angled, chamfered, radiused, etc. In general, reducing sharp angles on edges or transitions of the openings can help prevent the toy from being torn or destroyed by a pet such as a dog that may be prone to chewing behaviors.

Regarding channels, the channels can be straight through a toy and have a diameter at one end that is essentially the same as the diameter at the other end of the channel. In some implementations, channels can be angled or other than straight. Alternatively, in some implementations, the sides of a channel can be sloped to form a cone shaped channel where one opening coupled to the channel has a first size and a second opening coupled to the channel has a second size different than the first size.

Regarding material, some implementations can include silicone rubber (e.g., a self-healing silicone material or other silicone material). The self-sealing qualities of silicone combined with the rounded or beveled edges can give the toy a high degree of durability combined with a teeth-friendly cushion. Other materials can be used such as a compressed edible/digestible chew material that integrates the channels and beveled edges. A toy formed of a digestible material would not be "indestructible," of course, but might use the channels for air flow, and beveled edges to prolong the time it would take to deconstruct a toy "intended" to be chewed up.

Regarding toughness/indestructability (or near indestructability), these features are provided by the combination of the beveled edges and the silicone material to yield a toy that combines durability with airflow.

Regarding bounce and buoyancy, a degree of solidity in the center is important to the ratio of material to open space while allowing both bounce and buoyancy. In some implementations, a balance between indestructibility and bounce/buoyancy is achieved with 6-12 openings (3-6 channels), depending on the size of the holes.

Some implementations include a toy comprising a material that is formed into a shape, a first set of one or more holes on a periphery of the shape; and an optional second set of one or more holes on the periphery of the shape. In some implementations, one or more of the first set of holes or the second set of holes may extend from the periphery of the shape towards an interior region of the toy, and corresponding ones of the first set of holes and the second set of holes can be coupled by one or more channels through the toy. In some implementations, edges of the first set of one or more holes may be beveled or rounded. In some implementations, edges of the second set of one or more holes may be beveled or rounded. In some implementations, the shape may include one of a sphere, an ovoid, or a spheroid. In some implementations, the material may include one or more of silicone rubber, foam, a natural material, a synthetic material, a non-toxic material, a self-sealing material (e.g., silicone), a digestible material, a probiotic material, a luminescent material, a fluorescent material, a high-density material, a low-density material, a translucent material, or a transparent material. In some implementations, the interior region may include a region near a center of the toy. In some implementations, the channels may be sloped to form a cone shape. In some implementations, one or more of the first set of holes may be larger in size than one or more of the second set of holes.

Some implementations can include a ball comprising a material that is formed into a shape, a first set of one or more openings on a periphery of the shape, and an optional second set of one or more openings on the periphery of the shape. In some implementations, one or more channels coupling one or more of the first set of openings and one or more of the second set of openings may extend from the periphery of the shape towards an interior region connecting one or more of the first openings with one or more of the second openings. In some implementations, edges of the first set of openings may be beveled or rounded. In some implementations, edges of the second set of openings may be beveled or rounded. In some implementations, the shape may include one of a sphere, an ovoid, or a spheroid. In some implementations, the material may include one or more of silicone rubber, foam, a natural material, a synthetic material, a non-toxic material, a self-sealing material (e.g., silicone), a digestible material, a probiotic material, a luminescent material, a fluorescent material, a high-density material, a low-density material, a translucent material, or a transparent material. In some implementations, the interior region may include a region near a center of the ball. In some implementations, sides of the channels may be sloped (e.g., to form a cone shape). In some implementations, one or more of the first set of slits may be larger in size or dimensions than one or more of the second set of slits.

Some implementations include an object comprising a material that may be formed into a shape, a first set of one or more apertures on a periphery of the shape, and an optional second set of one or more apertures on the periphery of the shape. In some implementations, one or more of the first set of apertures or the second set of apertures may extend inward from the periphery of the shape towards an interior of the shape, forming one or more channels in the object. In some implementations, edges of the first set of apertures may be beveled or rounded. In some implementations, edges of the second set of apertures may be beveled or rounded. In some implementations, the shape may include one of a sphere, an ovoid, a cylinder, or a spheroid. In some implementations, the material may include one or more of silicone rubber, foam, a non-toxic material, a natural material, a synthetic material, a self-sealing material, a digestible material, a probiotic material, a luminescent material, a fluorescent material, a high-density material, a low-density material, a translucent material, or a transparent material. In some implementations, the channels may be sloped to form a cone shape. In some implementations, one or more of the first set of apertures of the object may be larger in size than one or more of the second set of apertures of the object.

Although the disclosed subject matter has been described in the context of a single implementation, the features, functions, and scale described may also be implemented in other implementations. In general, the features and implementations of the disclosed subject matter described herein will become obvious to one skilled in the art when viewed in conjunction with the ensuing description of the drawings and detailed description of the disclosed subject matter.

DETAILED DESCRIPTION

Figure 1:
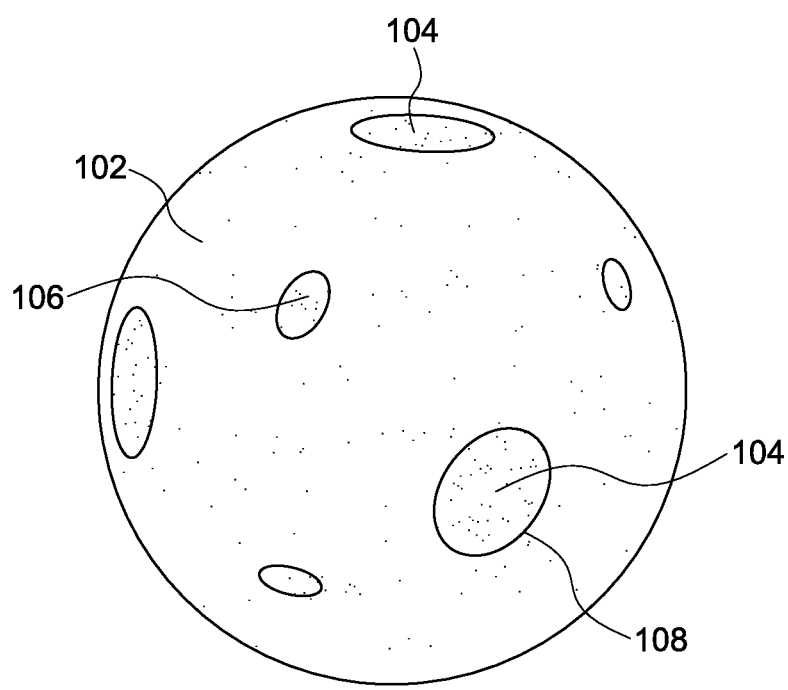
FIG. 1 is a perspective view of an example toy in accordance with some implementations.

In some implementations, the disclosed subject matter includes a toy (e.g., a ball) that is made of a durable material, e.g., silicone rubber or similar material, which is of a shape, e.g., spherical or other shape. In some implementations, the toy includes one or more holes, which can connect to channels extending through the center of the toy. For example, toy may include six large holes in some implementations. The toy may also include eight small holes in some implementations.

In some implementations, the aforementioned holes are coupled to corresponding channels that allow air to flow through the toy ball. The holes may thus facilitate circular breathing of a pet through such holes when the pet holds the toy ball between its jaws and/or inside its mouth. An advantage of this toy ball is that the ball provides a means for engaging pets frequently in active play in a safe manner during weather sufficient to cause a dog or other pet to overheat.

In some implementations, the toy ball provides a means for a pet to play, exercise, and engage with the pet's owner, including but not limited to, during hunting and/or activation of prey pursuit instincts or by throwing the toy ball for retrieval by the pet. In some implementations, the toy ball can be used both indoors and outdoors. In some implementations, the durable material used to make the toy ball (e.g., silicone rubber) renders a firm, long-lasting, bounceable, and/or floatable toy ball with a chew resistant surface. In some implementations, holes in the toy ball connect to channels to enable air to pass through the toy to the mouth of the pet when the pet holds the toy ball within its teeth or inside its mouth, e.g., such passage of air through the toy can help a dog cool its body through its tongue, mouth and throat area.

In some implementations, the slope of one or more edges of one or more of the holes prevents tearing of the toy ball by avoiding the formation of a point of contact that enables tearing of the material. In some implementations, the toy ball is made of a chew-resistant material. In some implementations, the toy ball is designed to be a chew proof pet toy. In some implementations, the one or more holes comprise smooth and/or bull-nosed sloped edges, which may avoid the formation of an edge that a pet can chew on, thereby offering a safe, chew proof experience for pets that are heavy chewers. Such pets most often need the extra outdoor activity.

In some implementations, the hollow interior portions formed by the holes and/or the channels enable insertion of treats and other motivators into cavities formed by the holes and/or the channels. In some implementations, the hollow interior portions, including the holes and the channels, enable a safe method for pets to engage, play, and/or exercise with the toy ball in weather sufficient to cause a dog or other pet to overheat by allowing passage of air from the outside through the toy to the tongue, gums, mouth and throat area of the pets through the holes and/or channels, thereby helping cool the body of the pets in weather sufficient to cause a dog or other pet to overheat. The toy ball may include holes, channels, or apertures of different sizes in some implementations. The different sizes may enable optimization of passage of air through the holes, apertures, or channels in some implementations, thereby enabling circular breathing and/or cooling of pets.

In some implementations, beveled and/or sloped edges of the openings (or holes/apertures/channels, etc.) form a bull-nosed slope along such openings. In some implementations, a bull-nosed slope prevents pets from grabbing or gnawing on the toy ball with teeth, claws, or other means in a manner that tears, pulls apart, rips out, or otherwise damages or ruins the toy. In some implementations, the slope of the edges of the openings do not snare or entrap the teeth of a pet that holds the toy between its teeth/jaws or chews on the toy, thereby protecting the teeth of the pet from damage as a result of entrapment or ensnarement.

In some implementations, the openings and/or channels together with a durable material form a toy that is buoyant, e.g., can float on liquids. In some implementations, the toy ball is bouncy, e.g., can bounce off a surface when the toy ball makes contact with a surface. The toy ball can be formed from a material having a density or other properties that enable it to bounce on a variety of surfaces in some implementations.

FIG. 1 is a perspective view of an example toy ball in accordance with some implementations. FIG. 1 shows an example toy ball 102 with example large holes 104 and example small holes 106, both designed with example beveled sloped edges 108. The numbers of large holes 104 and small holes 106 and their respective sizes (e.g., radii) may vary from implementation to implementation based on the requirement(s) for which the holes are designed.

Figure 2:
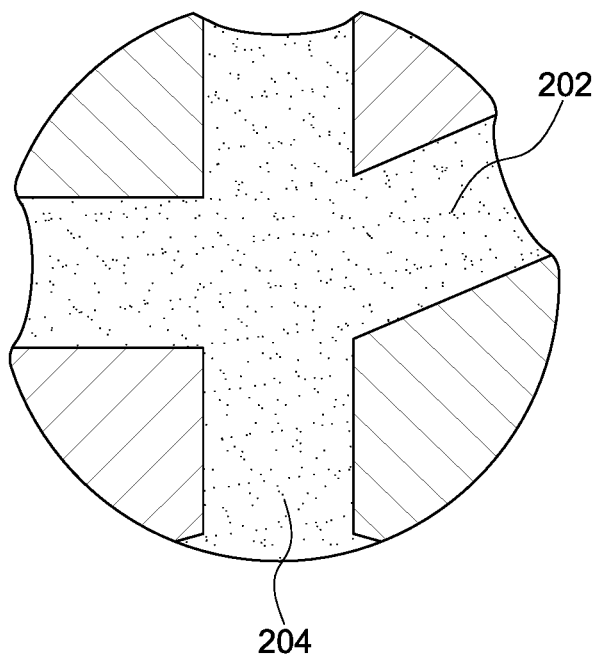
FIG. 2 is a sectional view of an example toy in accordance with some implementations.

FIG. 2 is a sectional view of an example toy ball in accordance with some implementations. FIG. 2 shows an example channel 202 with rounded hole opening edges and an example channel 204 with angled opening edges, where the airflow channels (202/204) extend from openings of the holes through the toy ball.

Figure 3:
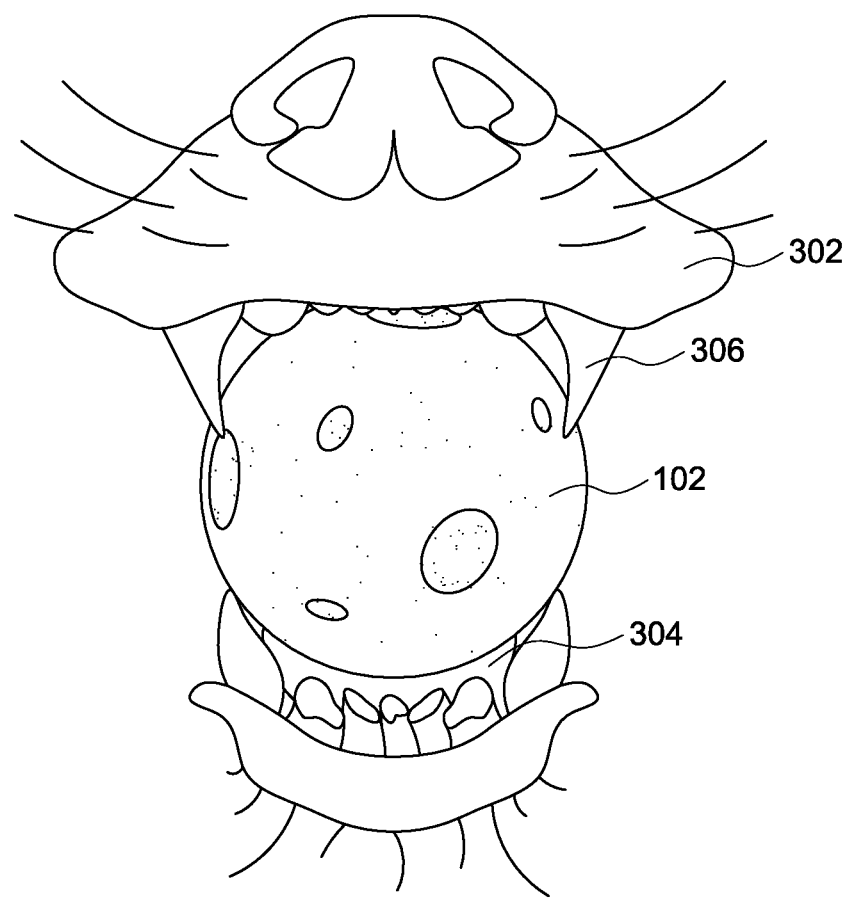
FIG. 3 shows example holes of an example toy held between the jaws of an example canine in accordance with some implementations.

FIG. 3 shows example holes of an example toy ball 102 held between the jaws of an example canine in accordance with some implementations. FIG. 3 shows the toy ball 102 lodged between the jaws 302 of an example canine (i.e., a dog) and pressing against the tongue 304 of the canine, with the teeth 306 of the canine pressing against the sides of the toy ball in the canine's mouth. The openings or holes can be made to be chew proof or chew resistant against the canine chewing on the ball by having rounded or beveled edges at the transition from an exterior of the toy to an interior of the holes or openings.

Figure 4:
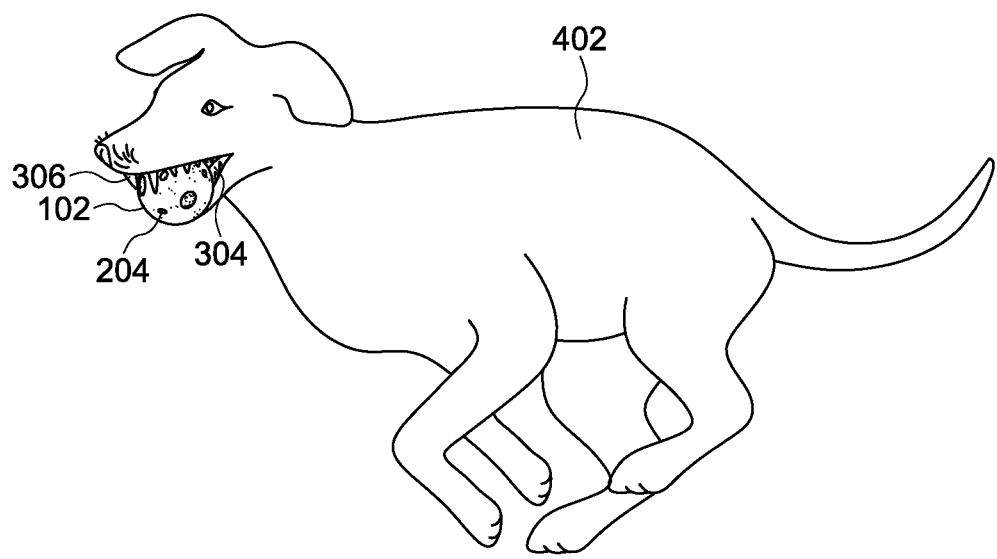
FIG. 4 shows an example toy in an example practical application or example use in accordance with some implementations.

FIG. 4 shows an example toy ball 102 in an example practical application or example use in accordance with some implementations. FIG. 4 shows the example toy ball in use, where an example canine 402 draws air through the air flow channels 204 towards the tongue 304 of the canine. This flow of air enables circular breathing within the canine's body and maintains a healthy canine body temperature by cooling the canine's body through air received by the tongue, mouth or throat area 304 from the outside via the air flow channels 204. In some implementations, the toy ball 102 is made of a self-sealing material. In some implementations, the toy ball 102 is designed to enable a gentle grasp of the toy ball 102 by the canine 402 so as to protect the teeth 306 of the canine 402.

In some implementations, one or more holes of the toy ball are sloped from an entrance of a hole of the ball to the center of a channel of the toy ball, thereby eliminating the formation of an edge that can be grabbed, bitten, grasped, chewed, or otherwise damaged or torn by a pet.

Figure 5:
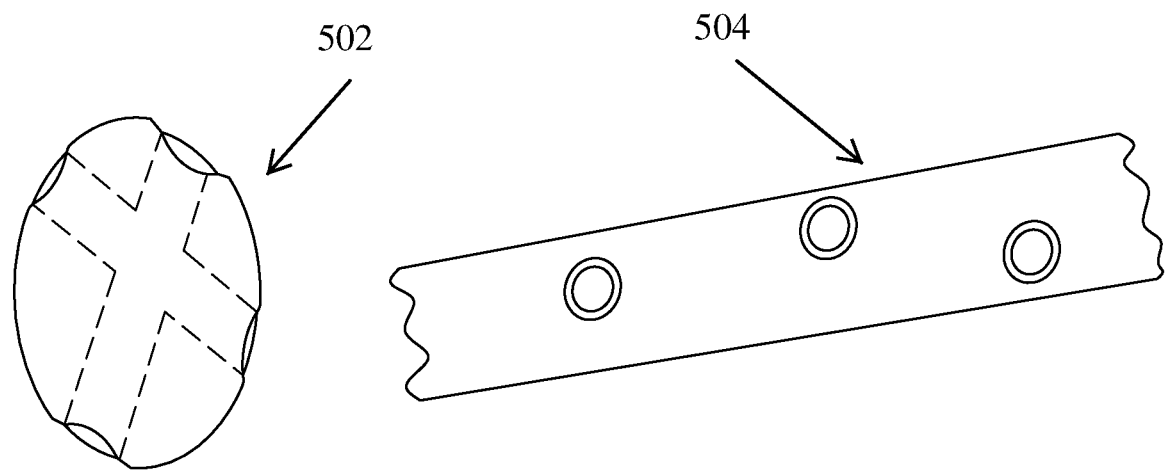
FIG. 5 shows example toy shapes including an oval and a stick shape each having one or more openings in accordance with some implementations.

FIG. 5 shows example toy shapes including an oval 502 and a stick shape 504 each having one or more openings in accordance with some implementations.

Figure 6:
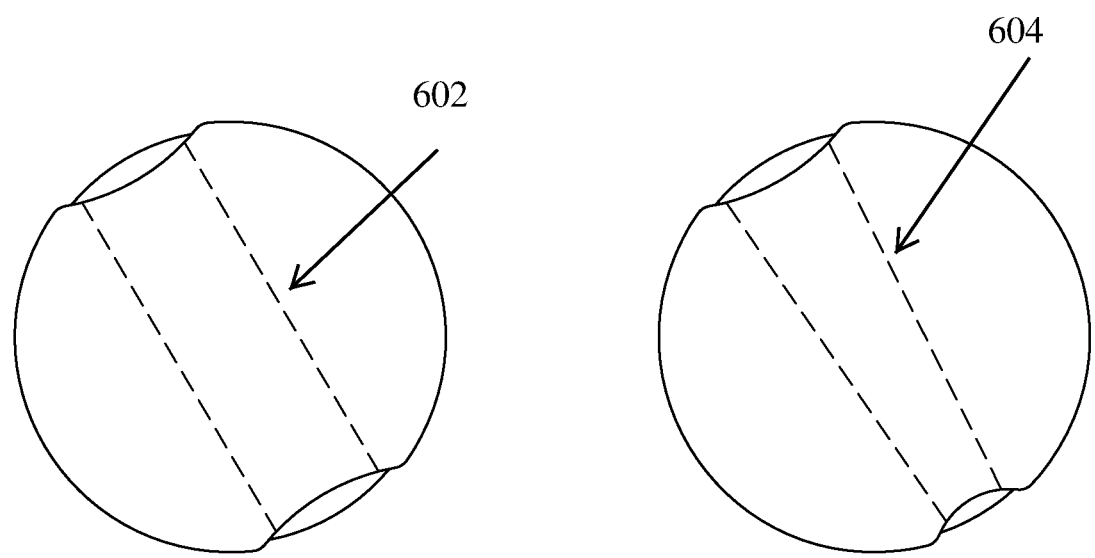
FIG. 6 shows example toys with a cylindrical channel and a cone shaped channel in accordance with some implementations.

FIG. 6 shows example toys with a cylindrical channel 602 and a cone shaped channel 604 in accordance with some implementations.

Figure 7:
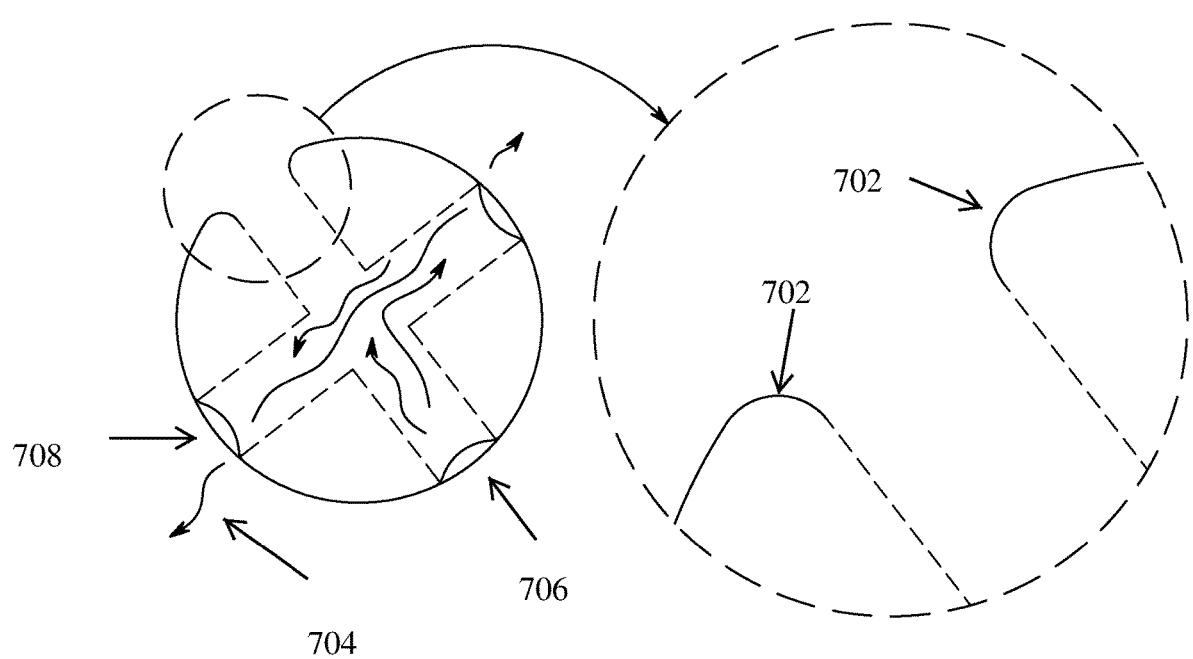
FIG. 7 shows details of an example toy with rounded opening edges in accordance with some implementations.

FIG. 7 shows details of an example toy with rounded opening edges 702 in accordance with some implementations. FIG. 7 also shows airflow 704 through the channels 706 and 708.

In some implementations, the size of a toy may vary depending on a number of factors such as desired air flow, desired buoyancy (i.e., the ability of a toy to float), and desired bounce when the toy makes contact with a surface. The balance between the flow of air and the density of the toy is designed to achieve desired bounce and buoyancy of the ball while ensuring circular breathing when a pet holds the toy between the jaws or in the mouth.

In some implementations, the sizes of the holes may vary depending on desired air flow required, desired buoyancy (i.e., the ability of a toy to float), and desired bounce when the toy makes contact with a surface. The balance between the flow of air and the density of the toy is designed to achieve desired bounce and buoyancy of the ball while ensuring circular breathing when a pet holds the toy between the jaws or in the mouth.

The toy may be designed and made in different shapes, e.g., spherical and ovoidal, dimensions and sizes, and colors depending on the pet for which the toy has to be designed. In some implementations, the toy may be in the shape of a spheroid, an ovoid, or a cylinder. In some implementations, the toy includes one or more holes with beveled and/or sloped edges to improve the resistance of the toy to chewing, gnawing, or tearing, i.e., the ball's chew resistance, and to decrease the chances of the toy being torn apart or damaged by a pet.

In some implementations, the toy may be made of material including but not limited to self-sealing material, high-density foam, glow in the dark material (e.g., for nighttime play), digestible material (e.g., for the chewing of and the eating of the toy by a pet), probiotic infused material (e.g., to aid and promote healthy digestion of the material by a pet), non-toxic material, natural material, synthetic material, luminescent material, fluorescent material, high-density material, low-density material, translucent material, and/or transparent material or others.

The foregoing description of the disclosed subject matter through its various implementations and embodiments and through accompanying drawings should not be construed to limit the scope of the inventive idea. It should be understood and be obvious to one skilled in the art that the implementations and embodiments of the inventive aspects described herein may be further modified without departing from the spirit and scope of the disclosed subject matter herein and as set forth in the claims that follow below herein.

In some implementations, the toy is spherical in shape. In some implementations, the toy comprises one or more holes within the toy to enable formation of one or more channels to enable air to flow from the outside to within the toy. In some implementations, the channels extend from the periphery or perimeter of the toy towards the center of the ball.

In some implementations, the toy is made of a durable material, including but not limited to silicone rubber. In some implementations, the toy is made of a flexible material, including but not limited to silicone rubber or foam. In some implementations, the toy is designed to have a density that enables the toy to bounce when the toy makes contact with a surface. In some implementations, the toy is designed to have a density that enables the toy to float on liquids. In some implementations, the toy is made of a material, including but not limited to silicone rubber or foam, which renders the toy buoyant, thus enabling the toy to float on liquids.

In some implementations, the toy has one or more sloped edges along one or more holes of the toy. In some implementations, the toy has one or more smoothed edges along one or more holes of the toy. In some implementations, the sloped edges and/or the smoothed edges render the toy difficult to be torn apart by a pet when the pet one or more of chews on the toy with its teeth or grasps the toy with one or more of its teeth or its jaws.

In some implementations, the holes in the toy are designed to enable a user or pet owner to hold the toy, grasp the toy, or pick up the toy by placing their fingers inside the holes and throw or fling the ball around while playing with the pet so as to avoid touching pet saliva or slobber or other debris present on the periphery or perimeter of the toy.

In some implementations, the toy facilitates a pet owner to engage their pet(s), including but not limited to canines. In some implementations, the toy is a multifaceted toy that can be used for engaging pets indoors or outdoors. In some implementations, the toy provides a degree of protection to the pets, e.g., dogs, from their body overheating in weather sufficient to cause a dog or other pet to overheat when the pets grasp the toy in the mouth between their jaws and against their tongue. In some implementations, the toy is designed to be chew resistant or chew proof, thereby preventing pets from tearing apart the toy when the pets chew on and/or grasp the toy.

Variations

It is contemplated that any optional feature of the inventive variations described may be set forth and claimed independently or in combination with any one or more of the features described herein. Reference to a singular item includes the possibility that there is a plurality of the same items present. More specifically, as used herein and in the appended claims, the singular forms "a," "an," "said," and "the" include plural referents unless specifically stated otherwise. In other words, use of the articles allow for "at least one" of the subject item in the description above as well as in the appended claims herein. It is further noted that the below appended claims may be drafted to exclude any optional element. As such, this statement is intended to serve as antecedent basis for use of such exclusive terminology as "solely," "only" and the like in connection with the recitation of claim elements or use of a "negative" limitation.

Without the use of such exclusive terminology, the term "comprising" in the appended claims shall allow for the inclusion of any additional element irrespective of whether a given number of elements are enumerated in the appended claims below or the addition of a feature could be regarded as transforming the nature of an element set forth in the appended claims herein. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of the appended claim language. Use of the term "disclosure" herein is not intended to limit the scope of the claims below in any manner. Rather, it should be recognized that the "disclosure" includes the many variations explicitly or implicitly described herein, including those variations that would be obvious to one of ordinary skill in the art upon reading this specification.

It is not intended that any section of this specification (e.g., the Summary, Detailed Description, Abstract, Field, etc.) be accorded special significance in describing the disclosed subject matter relative to each other or to the appended claims below. All references cited herein are incorporated by reference in their entirety. Although the foregoing disclosed subject matter or disclosure has been described in detail for the purposes of clarity of understanding, it is contemplated that certain modifications may be practiced within the scope of the following appended claims.

What is claimed is:

1. A toy comprising:
a solid, uniform material formed into a shape that is durable, the solid, uniform material defining a central channel; and
a first set of one or more holes on a periphery of the shape and extending at least partially into the shape to form an interior surface of each hole, wherein each hole includes a rounded edge at a transition between the periphery of the shape moving into the interior surface of each hole, wherein the interior surface of each hole defines a channel that is directed towards the central channel of the shape, and wherein a portion of the periphery of the toy surrounding each hole in the first set of one or more holes is flattened;

wherein each interior surface is substantially perpendicular to its respective hole;

wherein the rounded edge transition is configured to promote uninterrupted airflow of a pet as the pet breathes air in and out through the one or more holes to maintain a body temperature of the pet, wherein each rounded edge transition is configured to integrate seamlessly into its respective channel to prevent the rounded edge transition from being torn apart or damaged, improving edge durability and tear resistance when chewed on by the pet to mitigate tearing or destruction of the shape and an integrity of the toy, wherein the solid, uniform material is configured to maintain stability of the shape to facilitate uninterrupted airflow, and create bounce and buoyancy;

wherein each hole within the first set of one or more holes has an equal diameter.

2. The toy of claim 1, wherein the first set of one or more holes includes a plurality of holes.

3. The toy of claim 1, wherein the first set of one or more holes extends only partially into the shape.

4. The toy of claim 1, wherein the shape includes one of a sphere, an ovoid, a spheroid, a bone, a disc, a ring, an oval, a rope, a stick, a rod, a snake, a hedgehog, a pig, a cat, a dog, a squirrel, a rabbit, an animal, or an owl.

5. The toy of claim 1, wherein the material includes one or more of silicone rubber, foam, a natural material, a synthetic material, a non-toxic material, a self-sealing material, a digestible material, a probiotic material, a luminescent material, a fluorescent material, a high-density material, a low-density material, a translucent material, or a transparent material.

6. The toy of claim 1, further comprising a second set of holes on the periphery of the shape, wherein one or more holes of the first set of one or more holes and one or more holes of the second set of one or more holes are coupled via one or more channels, and wherein the one or more channels pass through an interior region of the toy, wherein, the one or more channels enable the airflow through the toy to facilitate breathing by the pet, allowing air to flow through the one or more holes of the first set of one or more holes or the second set of one or more holes from outside the toy to inside of a mouth of the pet.

7. The toy of claim 6, wherein one or more holes of the first set of holes are larger than one or more holes of the second set of one or more holes, wherein, the number of holes in the first set of one or more holes is fewer than the number of holes in the second set of one or more holes.

8. A ball comprising:

a material formed into a ball shape defining a center point inside the material;

a first set of one or more openings on a periphery of the ball extending at least partially into the ball shape to form an interior surface of each opening, defining a channel for each opening, wherein the channel of each opening is substantially perpendicular to the periphery, and directed towards the center point from the periphery, wherein each opening includes an edge at a transition between the periphery of the ball and the interior surface of the channel of its respective opening creating a flattened portion of the periphery of the ball surrounding each opening of the first set of one or more openings forming a truncated ball, wherein the edge of each opening is rounded from the periphery of the ball moving into its respective channel to create a rounded edge transition from the periphery of the ball into the respective channel, wherein the ball encompasses the channels with a solid form, maintaining stability of its shape to facilitate uninterrupted airflow, wherein the material is a uniform material, durable, and is configured to create bounce, buoyancy, and facilitate airflow in the ball, wherein, each rounded edge seamlessly transitions to integrate into its respective channel, extending from its respective opening to the center point of the shape to promote uninterrupted airflow as a pet breathes air in and out through the openings to maintain a body temperature of the pet, wherein, the rounded edge transition is configured to prevent the pet from damaging the edge, providing durability and tear resistance of the opening which when applied to each opening, mitigates tearing and prevents destruction of the ball, wherein, each opening within the first set of one or more openings has an equal diameter, wherein, the channels enable flow of air through the ball, which allow and promote circulation of air between an environment and the pet helping prevent over-heating while having the ball in and around a mouth of the pet.

9. The ball of claim 8, further comprising a second set of one or more openings on the periphery of the ball, wherein each hole opening within the second set of one or more openings has an equal diameter.

10. The ball of claim 9, wherein one or more of the first set of one or more openings or the second set of one or more openings are joined by one or more of the channels, wherein, the number of openings in the second set of one or more openings is greater than the number of openings in the first set of one or more openings, wherein the different opening sizes allow circular breathing by the pet when the ball is in different positions without restricting airflow.

11. The ball of claim 10, wherein the one or more channels extend through an interior region of the ball.

12. The ball of claim 10, wherein the channels are cylindrical in shape.

13. The ball of claim 8, wherein the ball shape includes one of a sphere, an ovoid, a spheroid, a bone, a disc, a ring, an oval, a rope, a stick, a rod, a snake, a hedgehog, a pig, a cat, a dog, a squirrel, a rabbit, an animal, or an owl.

14. The ball of claim 8, wherein the material includes one or more of silicone rubber, foam, a natural material, a synthetic material, a non-toxic material, a self-sealing material, a digestible material, a probiotic material, a luminescent material, a fluorescent material, a high-density material, a low-density material, a translucent material, or a transparent material.

15. An object comprising:

a material formed into a solid shape defining a central channel; and a first set of one or more apertures on a periphery of the shape, wherein each aperture includes an edge at a transition between the periphery of the object and an interior surface of a respective aperture, each interior surface defining a channel through the solid shape, and wherein the edge transition of each aperture from the periphery moving into the interior surface of its respective channel is rounded to form a rounded edge transition, and each edge surrounding each aperture of the first set of one or more apertures defines a flattened portion of the periphery of the object, wherein each channel is substantially perpendicular to its respective edge defining the aperture on the periphery of the object and directed towards the central channel, wherein at least one aperture is joined with at least a second aperture via their respective channels at the central channel, wherein the object is comprised of a uniform, solid material to maintain stability in the solid shape, and configured to create bounce and buoyancy in the object, wherein, the channels are configured to enable flow of air through the object, facilitating circulation of air between an environment and a pet using the object to help prevent over-heating while having the object in a mouth of the pet, wherein the rounded edge transition further promotes uninterrupted airflow as the pet breathes air in and out through the object, wherein the rounded edge transition is configured for durability and to prevent the pet from damaging the transition of each aperture edge and from being torn apart or damaged by the pet.

16. The object of claim 15, further comprising a second set of one or more apertures on the periphery of the object.

17. The object of claim 16, wherein one or more of the first set of one or more apertures are joined with the one or more apertures of the second set of one or more apertures via the channels, wherein each aperture within the first set of one or more apertures has an equal diameter, wherein each aperture within the second set of one or more apertures has an equal diameter, wherein the number of apertures in the second set of one or more apertures is greater than the number of apertures in the first set of one or more apertures, wherein the different aperture size is configured to allow circular breathing for the pet when the object is in different positions without restricting airflow.

18. The object of claim 17, wherein the channels extend through the central channel of the object.

19. The object of claim 15, wherein the shape includes one of a sphere, an ovoid, a spheroid, a bone, a disc, a ring, an oval, a rope, a stick, a rod, a snake, a hedgehog, a pig, a cat, a dog, a squirrel, a rabbit, an animal, or an owl.

20. The object of claim 15, wherein the material includes one or more of silicone rubber, foam, a non-toxic material, a natural material, a synthetic material, a self-sealing material, a digestible material, a probiotic material, a luminescent material, a fluorescent material, a high-density material, a low-density material, a translucent material, or a transparent material.

* * * * *